United States Patent
Dabbiere et al.

(10) Patent No.: US 9,231,818 B2
(45) Date of Patent: *Jan. 5, 2016

(54) FUNCTIONALITY MANAGEMENT VIA APPLICATION MODIFICATION

(71) Applicant: SkySocket, LLC, Atlanta, GA (US)

(72) Inventors: Alan Dabbiere, McLean, VA (US); Erich Stuntebeck, Marietta, GA (US)

(73) Assignee: AirWatch LLC, Atlanta, GA (US)

( * ) Notice: Subject to any disclaimer, the term of this patent is extended or adjusted under 35 U.S.C. 154(b) by 163 days.

This patent is subject to a terminal disclaimer.

(21) Appl. No.: 13/952,785

(22) Filed: Jul. 29, 2013

(65) Prior Publication Data

US 2013/0311660 A1 Nov. 21, 2013

Related U.S. Application Data

(63) Continuation of application No. 13/950,486, filed on Jul. 25, 2013.

(51) Int. Cl.
*H04L 29/08* (2006.01)
*G06F 21/60* (2013.01)
*H04L 12/24* (2006.01)
*H04L 12/14* (2006.01)
*G06F 21/54* (2013.01)
*G06F 21/62* (2013.01)

(52) U.S. Cl.
CPC .............. *H04L 29/08* (2013.01); *G06F 21/54* (2013.01); *G06F 21/60* (2013.01); *G06F 21/6218* (2013.01); *H04L 12/1435* (2013.01); *H04L 12/1467* (2013.01); *H04L 41/082* (2013.01)

(58) Field of Classification Search
CPC ......... H04L 29/08; H04L 63/20; H04L 63/10; H04L 63/0227; H04L 63/08; G06F 21/6218
See application file for complete search history.

(56) References Cited

U.S. PATENT DOCUMENTS

| | | | | |
|---|---|---|---|---|
| 8,046,763 | B1 | 10/2011 | Czajkowski et al. | |
| 8,281,408 | B2 * | 10/2012 | Corndorf | H04L 9/0631 380/258 |
| 8,478,901 | B1 * | 7/2013 | Poursohi | G06F 9/5038 700/248 |
| 8,706,869 | B2 * | 4/2014 | Campion | G06F 9/5066 709/219 |
| 8,850,528 | B2 * | 9/2014 | Van Biljon | G06Q 30/04 707/783 |
| 8,881,249 | B2 * | 11/2014 | Nunn | G06F 21/45 713/182 |

(Continued)

OTHER PUBLICATIONS

3rd Generation Partnership Project. "Technical Specification Group Service and System Aspects; Telecommunication Management; Charging Management; Diameter Charging Applications (Release 9)." 3GPP TS 32.299 V9.0.0, Jun. 2009, pp. 1-142, Sophia-Antipolis Cedex, France.*

(Continued)

*Primary Examiner* — Yonas Bayou
(74) *Attorney, Agent, or Firm* — Thomas | Horstemeyer, LLP

(57) ABSTRACT

Methods, systems, apparatuses, and/or computer-readable media for providing device management via application modification may be provided. In some embodiments, upon receiving a request to perform an action associated with an application, a determination as to whether performing the action will utilize a metered resource may be made. If so, a further determination may be made as to whether the request complies with at least one cost compliance policy and, in response to determining that the request complies with the at least one cost compliance policy, the action may be caused and/or authorize to be performed.

15 Claims, 4 Drawing Sheets

(56) References Cited

U.S. PATENT DOCUMENTS

| | | | |
|---|---|---|---|
| 8,893,007 B2 | 11/2014 | Vadde et al. | |
| 8,955,097 B2* | 2/2015 | Bright | H04L 63/02 726/11 |
| 2006/0294219 A1* | 12/2006 | Ogawa | H04L 41/0893 709/224 |
| 2007/0064650 A1 | 3/2007 | Lohtia et al. | |
| 2008/0247314 A1 | 10/2008 | Kim et al. | |
| 2009/0168661 A1 | 7/2009 | Lingafelt et al. | |
| 2009/0323672 A1 | 12/2009 | Gupta et al. | |
| 2010/0154209 A1* | 6/2010 | Bartelmuss | D21F 1/483 29/822 |
| 2010/0226347 A1 | 9/2010 | Caldwell et al. | |
| 2011/0185392 A1 | 7/2011 | Walker | |
| 2012/0110651 A1* | 5/2012 | Van Biljon | G06Q 30/04 726/4 |
| 2012/0117235 A1* | 5/2012 | Castro Castro | H04L 12/14 709/224 |
| 2012/0327787 A1* | 12/2012 | Mohammed | H04L 12/1407 370/242 |
| 2013/0086252 A1* | 4/2013 | Cutler | H04M 15/43 709/224 |
| 2013/0239166 A1* | 9/2013 | MacLeod | G06F 21/6218 726/1 |
| 2014/0269495 A1 | 9/2014 | Frantz et al. | |

OTHER PUBLICATIONS

Khor et al., "DaaS: DDoS Mitigation-as-a-Service" 2011, pp. 160-171.*

Non-Final Office Action mailed Dec. 5, 2014 for U.S. Appl. No. 14/019,667.

Non-Final Office Action mailed Dec. 3, 2014 for U.S. Appl. No. 13/950,486.

Non-Final Office Action mailed Jan. 9, 2015 for U.S. Appl. No. 14/036,661.

International Search Report mailed Dec. 4, 2014 for PCT/US2014/047729.

Office Action mailed for U.S. Appl. No. 14/019,667 mailed Apr. 29, 2015.

* cited by examiner

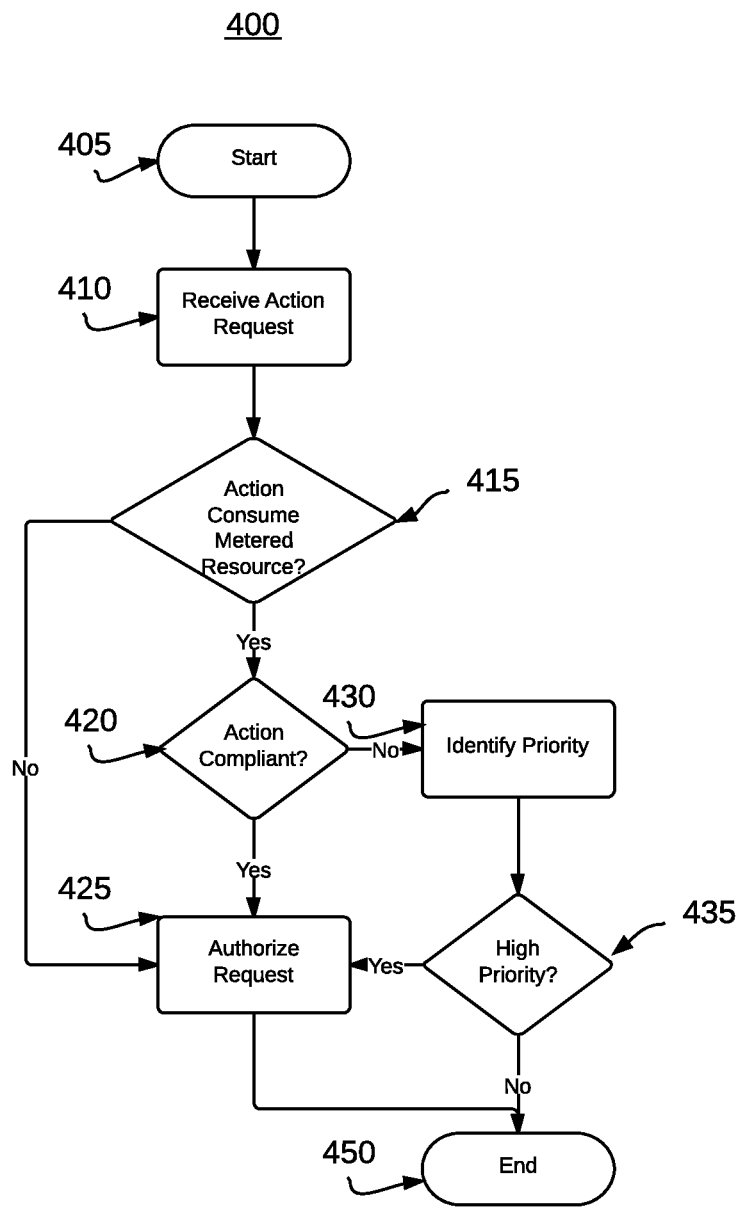

US 9,231,818 B2

FUNCTIONALITY MANAGEMENT VIA APPLICATION MODIFICATION

BACKGROUND

Device functionality management provides options for controlling the behavior of devices through provision of a software development kit (SDK), application wrapping, and compliance rules. In some situations, applications executing on mobile devices may consume large amounts of data. Since many telecommunications providers allot only a certain amount of data per billing cycle, it is easy for such applications to exceed the allotment and incur additional charges. Similarly, pre-paid plans offer a limited amount of data before additional payments are required. Furthermore, mobile devices operating outside of their home area (e.g., roaming internationally) may also incur significant charges. Additionally, mobile devices are typically battery powered, and network operations, such as receiving and transmitting data, often comprise battery-intensive operations. Conventional approaches simply continue to transmit data and incur additional charges, and allow the device to rapidly deplete its battery power.

SUMMARY

This Summary is provided to introduce a selection of concepts in a simplified form that are further described below in the Detailed Description. This Summary is not intended to identify key features or essential features of the claimed subject matter. Neither is this Summary intended to be used to limit the claimed subject matter's scope.

Methods, systems, apparatuses, and/or computer-readable media for providing device management via application modification may be provided. In some embodiments, upon receiving a request to perform an action associated with an application, a determination as to whether performing the action will utilize a metered resource may be made. If so, a further determination may be made as to whether the request complies with at least one cost compliance policy and, in response to determining that the request complies with the at least one cost compliance policy, the action may be caused and/or authorize to be performed.

It is to be understood that both the foregoing general description and the following detailed description are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the detailed description.

BRIEF DESCRIPTION OF THE DRAWINGS

Many aspects of the present disclosure can be better understood with reference to the following diagrams. The drawings are not necessarily to scale. Instead, emphasis is placed upon clearly illustrating certain features of the disclosure. Moreover, in the drawings, like reference numerals designate corresponding parts throughout the several views. In the drawings:

FIG. 4 is a flow chart illustrating a method for device functionality management.

DETAILED DESCRIPTION

Figure 1:
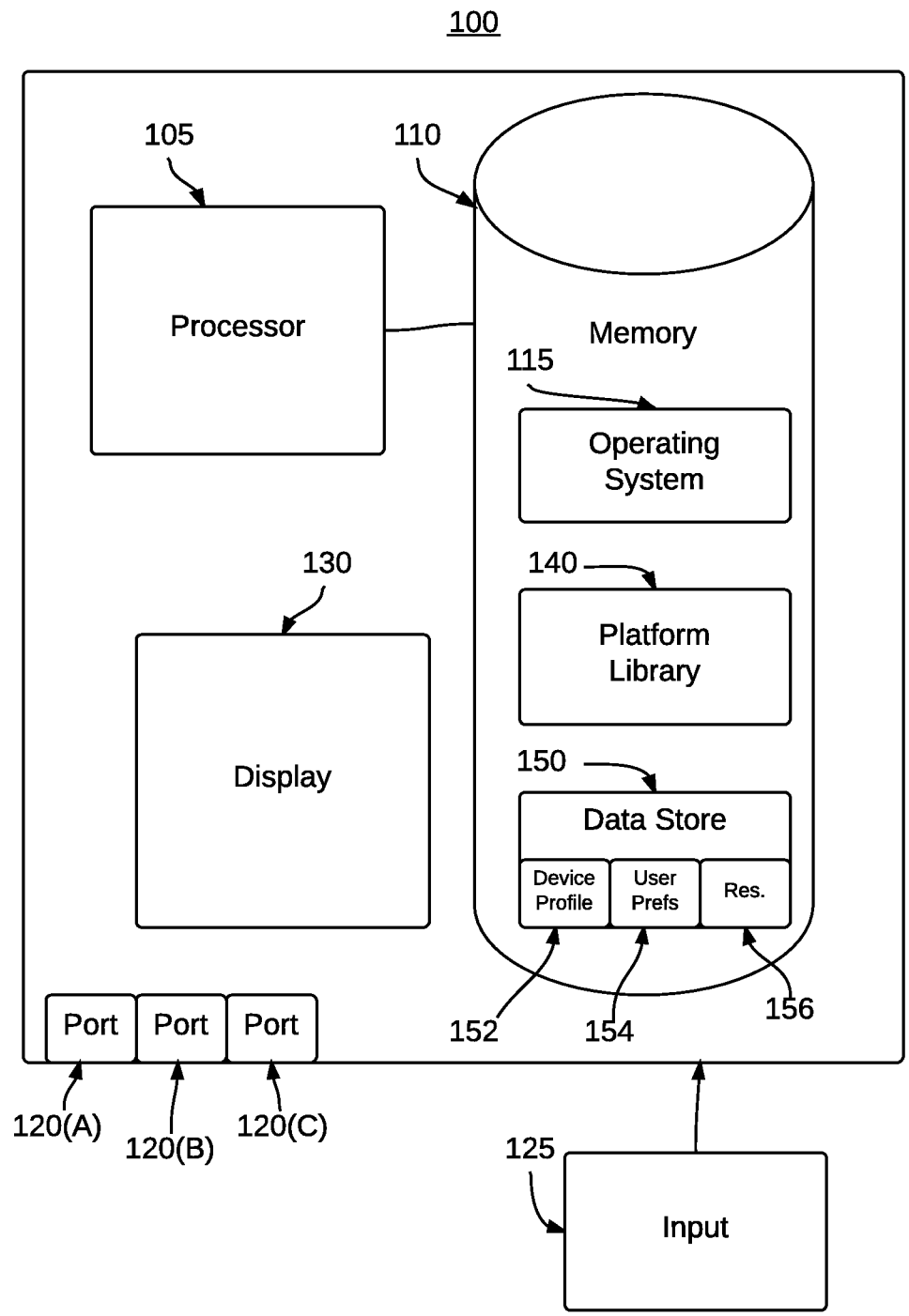
FIG. 1 is a block diagram of a user device.

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Device functionality management may be provided. Specifically, management of metered resources such as data usage and battery power may be optimized to reduce overage charges and prioritize applications as battery power is depleted. In some embodiments, methods, systems, and/or apparatuses may be provided to aid in ensuring that a device's data plan/subscription does not run out or exceed a monthly allocation. In some embodiments, methods, systems, and/or apparatuses may be provided to preserve battery life and aid in ensuring that the battery level does not run out. For example, features that are battery/data intensive, such as data transmission protocols, global positioning services, etc. may be restricted to wireless rather than cellular networks and/or home regions rather than areas in which a mobile device may be subject to a roaming surcharge.

The technical effects of some embodiments of this disclosure may include establishing control of access to networks and assets when access lists may not be predefined, and reducing and/or eliminating the burden of predefining access lists to control access to networks and assets. Moreover, the technical effects of some embodiments may include enhancing network access control by assigning specific access rights based on access lists to client devices authorized to access associated network beacons and assets.

Other technical effects of some embodiments of this disclosure may offer group management solutions to managing content access and distribution. For example, users of a sales group may have read access to marketing documents and presentations, while users in a marketing group may be able to edit and/or annotate the market documents. Similarly, users in an accounting or business services group may be the only ones with access to enterprise financial documents. These access controls may be provided by distributing authorization credentials to devices associated with users of the respective group. Each user may then authenticate to their device, such as by inputting a username, password, authentication key, and/or biometric data, before the device may access and/or retrieve the content authorized for distribution to that device. These authentication types are provided as examples only and are not intended to be limiting as many other types of user authentication are in use and/or may be contemplated in the future.

Content access may be further limited by policies that enforce other compliance restrictions based on properties of the device such as time, location, device security and/or integrity, presence of another device, software versions, required software, etc. For example, educational settings may designate student and instructor groups. These groups may be further assigned to specific classes such that only student group members associated with a given class may access content associated with that class. Further, edit access to the content for the class may be restricted to the user(s) in the instructor group and/or student group members may be permitted to add content that only the instructor may view (e.g., homework assignments.) In some embodiments, the instructor group user(s) may be able to push content to student group user(s) and/or activate temporary control of the students' devices to prevent the devices from accessing non-class related content during class time.

To reduce the cost of ownership of user devices and cellular and/or data service charges associated with use of such user devices, an enterprise such as an educational institution and/or a business may implement a "bring your own device" (BYOD) policy to allow an employee to use his/her personal device to access enterprise assets rather than provide the user with an enterprise owned user device for such purpose. To support such a BYOD policy, a user device administrator (i.e. IT administrator) may manage a group of personally owned user devices, via a management application executed by a management server in communication with the user devices over a network, to provide the user devices with secure access to enterprise assets.

The user device administrator may enroll user devices into the management system to monitor the user devices for security vulnerabilities and to configure the user devices for secure access to enterprise assets. The user device administrator may create and/or configure at least one configuration profile via a user interface provided by the management system. A configuration profile may comprise a set of instructions and/or settings that configure the operations and/or functions of a user device, which may ensure the security of the accessed assets. The user device administrator may, for instance, configure an enterprise email configuration profile by specifying the network address and access credentials of an enterprise email account that the users of the user devices are authorized to access. Other configuration policies may include, but are not limited to, hardware, software, application, function, cellular, text message, and data use restrictions, which may be based at least in part on the current time and/or location of the restricted user device. The user device administrator may thereafter deploy the configuration profiles to specific user devices, such as to groups of user devices of users with similar roles, privileges and/or titles.

Access credentials may uniquely identify a client device and/or the user of the client device. For example, the access credentials for a user may comprise a username, a password, and/or biometric data related to facial recognition, retina recognition, fingerprint recognition, and the like. Access credentials related to a device may uniquely identify the device and may comprise, for example, a unique hardware identifier such as a GUID (Globally Unique Identifier), UUID (Universally Unique Identifier), UDID (Unique Device Identifier), serial number, IMEI (Internationally Mobile Equipment Identity), Wi-Fi MAC (Media Access Control) address, Bluetooth MAC address, a CPU ID, and/or the like, or any combination of two or more such hardware identifiers. Additionally, the access credentials may be represented by a unique software identifier such a token or certificate, based at least in part on the aforementioned unique hardware identifiers.

The user devices may also have access to personal configuration profiles that may be created by the users of the user devices. The user devices may, for instance, have access to a personal email configuration profile that was created by a user of the user device to provide access to her personal email account. Thus, a user device enrolled in a BYOD management system may have more than one configuration profile for a given use of the user device, such as a personal email configuration profile and an enterprise email configuration profile that are both used for accessing email accounts on the user device.

The user devices may be instructed to enable and/or disable certain configuration profiles according to authorization rights specified by the user device administrator, such as location and/or time-based authorization rights. For example, a BYOD policy may specify that user devices enrolled in the BYOD management system are authorized for personal use outside of the workday and are authorized for business use during the workday. Similarly, a BYOD device may be restricted to enterprise uses while in work locations and/or prohibited from accessing enterprise assets while outside of secure work locations. To implement such a policy, a user device administrator may instruct the user devices to toggle between personal configuration policies and enterprise configuration policies based on factors such as the current time and/or location associated with the user device.

The current time may be based on the current time at the current location of the user device, which may be determined by GPS, Wi-Fi, Cellular Triangulation, etc., or may be based on the current time at a configured primary location associated with the user device, which may be the primary office location of an employee user of the user device. As an example, time-based configuration profile toggling may be provided by instructing a user device to enable business configuration profiles and disable personal configuration profiles while the current time is between 9 AM and 5 PM at the current location of the user device, and to disable business configuration profiles and enable personal configuration profiles while the current time is between 5 PM and 9 AM at the current location of the user device.

Consistent with embodiments of this disclosure, control over metered resources may be provided. Metered resources may comprise, for example, hardware resources, software resources, data resources, and/or power resources. Hardware resources may comprise, for example, access to hardware components, peripheral devices, processing time, memory, and/or processor cores and/or threads. Software resources may comprise, for example, data, programmatic functionality, and/or device drivers. Data resources may comprise storage amounts, access to particular data, certificates for authentication, and/or data transmission and reception resources. Power resources may comprise usage of a device's power supply, whether it comprise battery power and/or outside power.

For example, a request to download a large file may be recognized as consuming a large amount of metered data. User device 100 may comprise a limited amount of pre-paid data and/or may receive a periodic allotment of data from a data service provider (e.g., two gigabytes per month). Exceeding the pre-paid or allocated data may then incur a charge for additional data resources. As a user consumes the metered data, compliance and/or cost control policies may identify actions that may use the metered data and respond accordingly, such as by prioritizing requests for use of the metered resource and/or forbidding the performance of actions that may use large amounts and/or a large percentage of the remaining metered resource.

In some embodiments, non-approved applications may be limited and/or prohibited from consuming metered resources. For example, game applications that consume metered data may be prevented from using data during work hours, or if a certain threshold of data usage has been reached. In some embodiments, the threshold may be statically defined, such by prohibiting certain applications (either specifically or as a categorical group) from using more than 10% of a monthly data quota. In some embodiments, the threshold may be dynamic, such as by pro-rating the amount of data the application may consume on a periodic (e.g., daily, weekly, monthly, etc.) basis and/or reducing the amount of data the application may consume as a monthly data quota is neared.

In some embodiments, a management server may attempt to communicate with a mobile device, such as by requesting that the device check-in with the management server. If the management server does not receive a response from the device, or the management server receives a response that the device has insufficient data remaining, the management server may send a message to the device to ask/instruct a user of the device to replenish the data plan to a sufficient level and/or authorize the device to exceed the data allocation, possibly at an additional cost. In some embodiments, the management server may integrate with a carrier associated with the mobile device to an extent to allow the management server to request that the carrier replenish the data plan to a sufficient level on behalf of the user of the device. In some embodiments, in response to a failure to replenish the data plan by either the user of the device or the carrier, the management server may send a message to the device to prohibit the device from using data-intensive features until the data plan is replenished. For example, the device may be limited to wi-fi only data operations once data level drops below configurable level.

In some embodiments, a management server may attempt to communicate with a mobile device, such as by requesting that the device check-in with the management server. If the management server does not receive a response from the device, or the management server receives a response that the device has insufficient battery power remaining, the management server may send a message to the device instructing the user of the device to replenish the battery to a sufficient level. In response to a failure to replenish the battery, the management server may send a message to the device to prohibit the device from using battery-intensive features until the battery is replenished.

In some embodiments, different data transmission protocols may be enabled based on various conditions, such as availability of resources, time and location of a device. Because cellular data tends to be more expensive than wireless networking data, restricting cellular usage until necessary is desirable to control the cost of network usage. For instance, if content is required to be distributed to a device in 7 days (such as for flight manuals for FAA required monthly updates), then the device may be restricted to downloading the content over wi-fi for the next 6 days. If the device does not come into contact with a wi-fi network within the 6 day window, the device may toggle to enable cellular transmission of the content on the last day to ensure that the legally required documents are on the device before the required date.

In some embodiments, control of the transmission protocol enabled for distribution of content and/or assets may be based on the location of the device. Public wi-fi networks may be untrusted, for example, subjecting a device to potential security risks. Non-native, or roaming, cellular networks may be similarly susceptible to potential security risks. Additionally, charges related to accessing "guest" wi-fi networks and "roaming" cellular networks may apply. Location-based policies may be configured for which transmission protocols are allowed. For example, a device in the USA may be allowed to use any wi-fi network, including public and/or guest wireless networks, such as those at coffee shops and hotels, whereas the same device, while in other countries, may not be allowed to use public wi-fi networks because of the potential threats to asset security. Similarly, the device may be only be allowed to access roaming cellular networks in specific countries, due to costs and/or concern over the security of regional cellular carriers. In some embodiments, toggling between cellular and wi-fi data may be associated with a learned configuration. For example, the configuration may take into account a user's past movements to determine whether the device is likely to be on a secure wi-fi network in time. The configuration may also take the size of the data chunk to be downloaded into account to ensure the toggle is made in time before the info is needed. In some embodiments, an option to ask the user whether to proceed if data roaming charges will apply or a large amount of data will be required may be presented for approval and/or confirmation. In some embodiments, application use may be disabled unless wi-fi network access and/or a virtual private network (VPN) is enabled. This may be used in conjunction with other network tunneling techniques, such as where an application routes network traffic through a security or management server.

FIG. 1 is a block diagram of a user device 100 comprising a processor 105 and a memory 110. Depending on the configuration and type of device, memory 110 may comprise, but is not limited to, volatile (e.g. random access memory (RAM)), non-volatile (e.g. read-only memory (ROM)), flash memory, or any combination. Memory 110 may store executable programs and related data components of various applications and modules for execution by user device 100. Memory 110 may be coupled to processor 105 for storing configuration data and operational parameters, such as commands that are recognized by processor 105.

Basic functionality of user device 100 may be provided by an operating system 115 contained in memory 100. One or more programmed software applications may be executed by utilizing the computing resources in user device 100. Applications stored in memory 110 may be executed by processor 105 (e.g., a central processing unit or digital signal processor) under the auspices of operating system 115. For example, processor 105 may be configured to execute applications such as web browsing applications, email applications, instant messaging applications, and/or other applications capable of receiving and/or providing data.

Data provided as input to and generated as output from the application(s) may be stored in memory 110 and read by processor 105 from memory 110 as needed during the course of application program execution. Input data may be data stored in memory 110 by a secondary application or other source, either internal or external to user device 100, or possibly anticipated by the application and thus created with the application program at the time it was generated as a software application program. Data may be received via any of a plurality of communication ports 120(A)-(C) of user device 100. Communication ports 120(A)-(C) may allow user device 100 to communicate with other devices, and may comprise components such as an Ethernet network adapter, a modem, and/or a wireless network connectivity interface. For example, the wireless network connectivity interface may comprise one and/or more of a PCI (Peripheral Component Interconnect) card, USB (Universal Serial Bus) interface, PCMCIA (Personal Computer Memory Card International Association) card, SDIO (Secure Digital Input-Output) card, NewCard, Cardbus, a modem, a wireless radio transceiver, and/or the like.

User device 100 may also receive data as user input via an input component 125, such as a keyboard, a mouse, a pen, a stylus, a sound input device, a touch input device, a capture device, etc. A capture device may be operative to record user(s) and capture spoken words, motions and/or gestures, such as with a camera and/or microphone. The capture device may comprise any speech and/or motion detection device capable of detecting the speech and/or actions of the user(s).

Data generated by applications may be stored in memory 110 by the processor 105 during the course of application program execution. Data may be provided to the user during application program execution by means of a display 130. Consistent with embodiments of this disclosure, display 130 may comprise an integrated display screen and/or an output port coupled to an external display screen.

Memory 110 may also comprise a platform library 140. Platform library 140 may comprise a collection of functionality useful to multiple applications, such as may be provided by an application programming interface (API) to a software development kit (SDK). These utilities may be accessed by applications as necessary so that each application does not have to contain these utilities thus allowing for memory consumption savings and a consistent user interface. The platform library 140 may also provide functionality associated with app-wrapping, defined herein as applications that have been modified to add additional functionality. For example, an existing game application may be wrapped to provide support for compliance rules such as those that prohibit the application from executing during work hours. The platform library 140 is described in greater detail below with respect to FIG. 3.

Furthermore, embodiments of this disclosure may be practiced in conjunction with a graphics library, other operating systems, or any other application program and is not limited to any particular application or system. The devices described with respect to the Figures may have additional features or functionality. For example, user device 100 may also include additional data storage devices (removable and/or non-removable) such as, for example, magnetic disks, optical disks, or tape (not shown).

User device 100 may comprise a desktop computer, a laptop computer, a personal digital assistant, a cellular telephone, a set-top box, a music player, a web pad, a tablet computer system, a game console, and/or any other device with like capability.

User device 100 may store in a data store 150 a device profile 152 and a plurality of user preferences 154. Device profile 152 may comprise an indication of the current position of user device 100 and/or indications of the hardware, software, and security attributes which describe user device 100. For instance, device profile 152 may represent hardware specifications of user device 100, version and configuration information of various software program and hardware components installed on user device 100, data transmission protocols enabled on user device 100, version and usage information of various assets stored on user device 100, and/or any other attributes associated with the state of user device 100. The device profile 152 may further comprise data indicating a date of last virus scan of user device 100, a date of last access by an IT representative, a date of last service by the IT representative, and/or any other data indicating maintenance and usage of user device 100. Furthermore, the device profile 152 may comprise indications of the past behavior of associated users, such as assets accessed, charges for asset accesses, and the inventory accessed from such assets. User preferences 154 may comprise a listing of factors that may affect the experience of the user. In particular, user preferences 154 may include indications of the user's age, gender, bodily traits, preferred asset types, preferred venue assets, and combinations thereof.

User device 100 may also store at least one asset 156 in the data store 150. Assets 156, for instance, may include any electronic data, such as databases, applications, text files, word processor files, spreadsheet files, presentation files, graphic files, audio files, photographic files, video files, applications and application files, and/or the like. More specifically, assets 156 may include at least one of the following file types: data files, audio files, video files, three-dimensional image files, raster image files, vector image files, page layout files, spreadsheet files, database files, executable files, CAD files, web files, plug-in files, font files, system files, settings files, encoded files, compressed files, disk image files, developer files, backup files, and/or any other files.

The user device 100 may further be configured to execute various applications. For example, the user device 100 may be configured to execute applications such as web browsing applications, email applications, instant messaging applications, and/or other applications capable of receiving and/or rendering assets 156 on display 130. Any applications capable of receiving and/or rendering assets 156 on display 130 are generally referred to herein as a "client side application". The client side application(s) may be stored in the memory of the user device 100. In some embodiments, a client side application may comprise a secure container program that may be authorized to receive and render selected assets 156. The secure container program may further contain a decryption key specific to a distribution service that enables the secure container program to decrypt assets 156 transmitted by the distribution service that have been encrypted by the distribution service to prevent unauthorized programs from accessing the assets 156 on the user device 100.

Figure 2:
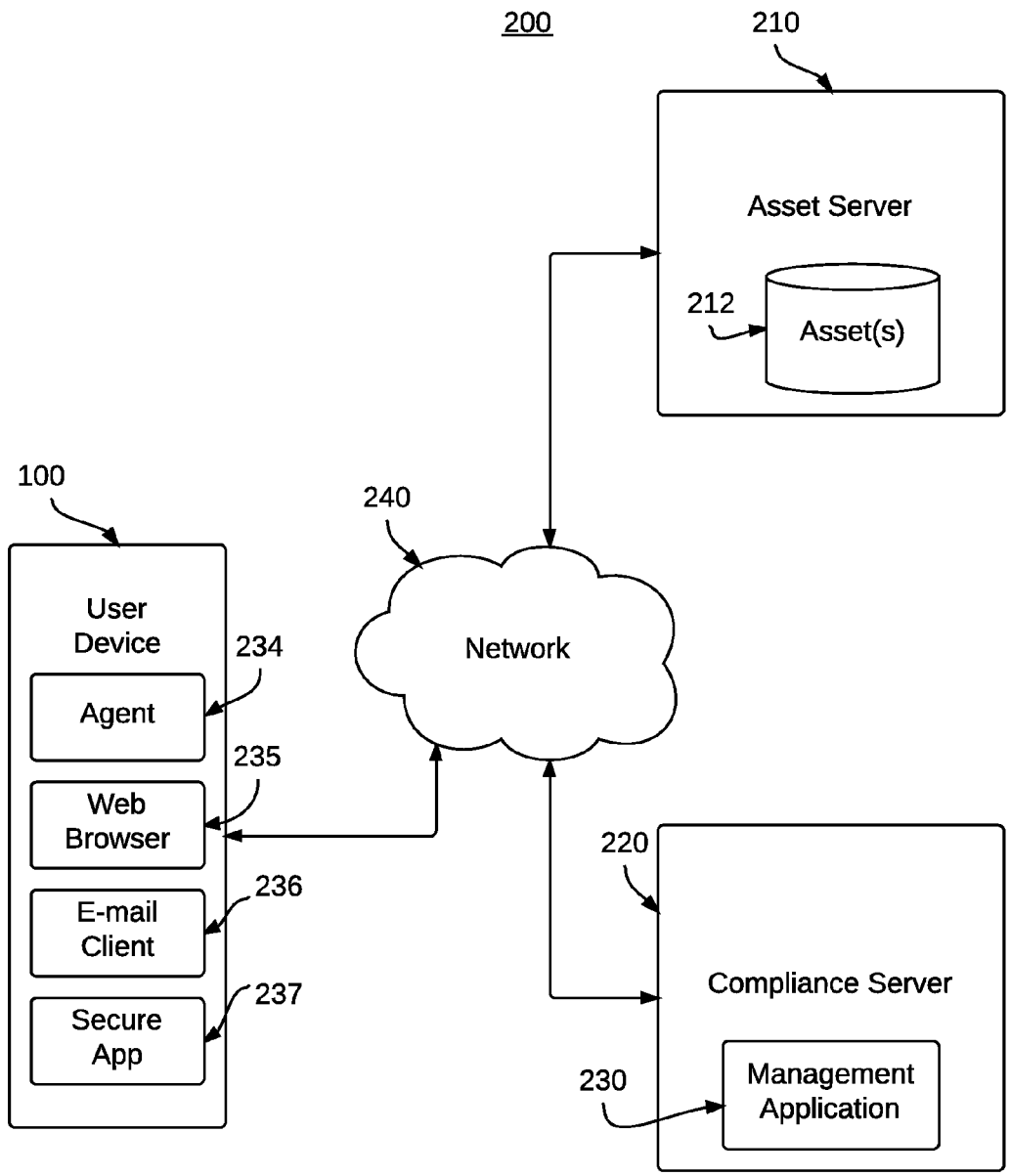
FIG. 2 is a block diagram of an operating environment for providing device management.

FIG. 2 is a block diagram view of an operating environment 200 comprising user device 100 in communication with a asset server 210, which may provide one or more asset(s) 215, and a compliance server 220, which may provide a management application 230, via a network 240. User device 100, asset server 210, and/or compliance server 220 may be operative to communicate via network 240. In some embodiments, management application 230 may be operative to execute on user device 100 and/or asset server 210.

The compliance server 220 may comprise, for example, cloud-based solutions, server computers and/or any other system providing device management capability. For purposes of convenience, the compliance server 220 is referred to herein in the singular, although it is understood that a plurality of servers may be employed in the arrangements as descried herein. Furthermore, in some embodiments, multiple compliance servers 220 may operate on the same server computer. The components executed on the compliance server 220, for example, may comprise various applications, services, processes, systems, engines, or functionality not disclosed in detail herein.

The compliance server 220 may comprise management application 230 comprising a plurality of compliance rules and/or policies that may be applicable to user device 100. While the management application 230 is shown as within the compliance server 220, the management application 230 may alternately be within the user device 100 and/or remotely located on the asset server 210 and may be remotely updated periodically by compliance server 220 according to common over-the-air (OTA) updating methods. Attempts by user device 100 to perform certain functionality on user device 100 may require user device 100 to be in compliance with one and/or more of the compliance policies/rules. Depending on the sensitivity of a given functionality, different compliance rules may be necessary to ensure that the functionality is adequately restricted. Some functionality may only require ensuring that the proper user is requesting the functionality. Other assets may require compliance with more stringent authorization rules, such as determining whether the functionality is restricted during certain time windows. Accordingly, user device 100 and/or compliance server 220 may be operative to determine whether the user of user device 100 is authorized to perform requested functionality at the time the user requests to perform such functionality.

Compliance server 220 may use the compliance rules to impose hardware restrictions regarding the use of specific wireless devices and specific wireless device features, such as, for instance, cameras, Bluetooth, IRDA, tethering, external storage, a mobile access point, and/or other hardware restrictions. The compliance rules may also impose software restrictions such as the use of specific wireless device operating systems or applications, internet browser restrictions, screen capture functionality, and/or other software restrictions. Mobile device management restrictions included in the compliance rules may comprise encryption requirements, firmware versions, remote lock and wipe functionalities, logging and reporting features, GPS tracking, and/or other mobile device management features.

The compliance server 220 may determine whether the device characteristics of a requesting device (e.g. user device 100) satisfy one or more of the restrictions enumerated in the compliance rules. For example, the compliance server 220 may determine that a requesting device that has a camera, Bluetooth capability, and is executing a specified version of an operating system is compliant with the compliance rules. As another example, the compliance server 220 may determine that a requesting device that is associated with an external storage unit and has screen capture functionality enabled is not compliant with the compliance rules.

In some embodiments, an agent application 234 executed on user device 100 may make the compliance determination based on the device profile, credentials, and/or user preferences. For instance, the agent application 234 may monitor calls by applications, such as a client application 235, and/or a secure application 236, on user device 100 to the operating system 115 of user device 100 to determine whether user device 100 seeks to perform functionality associated with one and/or more of the compliance rules described above. Additionally, the agent application 234 on user device 100 may approve and/or deny the associated functionality requests. For instance, the agent application 234 may instruct operating system 115 on user device 100 to disable the camera of user device 100 in response to a determination that a compliance rule specifies that the camera cannot be used at the time of the request by the user device 100 to operate the camera.

In some embodiments, the agent application 234 executed on user device 100 may rely on compliance server 220 to determine whether a given functionality request on user device 100 is permitted according to the compliance rules. For instance, the agent application may transmit a functionality request, a device profile, credentials, and/or user preferences to compliance server 220 so that compliance server 220 may determine whether user device 100 seeks to perform functionality that may violate a given compliance rule. Additionally, compliance server 220 may approve and/or deny the associated functionality requests. For instance, compliance server 220 may instruct the agent application 234 on user device 100 to instruct operating system 115 to activate a VPN security profile prior to opening a document and/or link.

In some embodiments, the compliance rules may comprise device settings and/or executable instructions that define which functionality the operating system 115 of user device 100 is authorized to perform. Furthermore, the compliance rules may comprise a list of functions, such as those provided by APIs associated with operating system 115 and/or platform library 140, that may be treated as protected functions. Calls to these functions, such as calls to retrieve login credentials, may result in checks by user device 100 and/or compliance server 220 for compliance with the compliance rules.

In some embodiments, the agent 234 may perform a set of ordered operations to accomplish a requested function. These operation sets may be defined by the user device 100 and/or compliance server 220 and may comprise one and/or more operations to determine whether the user device 100 is in compliance with policies from policy store 230. The agent 234 may control at least one respective computing resource of the user device 100. The operations may include configuring at least one respective computing resource of the user device 100 such as restricting access to at least one asset managed by the agent 234.

The Network 240 may comprise, for example, any type of wired and/or wireless network such as a wireless local area network (WLAN), a wireless wide area network (WWAN), Ethernet, fiber-optic network, and/or any other type of wired and/or wireless network now known or later developed. Additionally, the Network 240 may be or include the Internet, intranets, extranets, microwave networks, satellite communications, cellular systems, PCS, infrared communications, global area networks, or other suitable networks, etc., or any combination of such networks.

Figure 3:
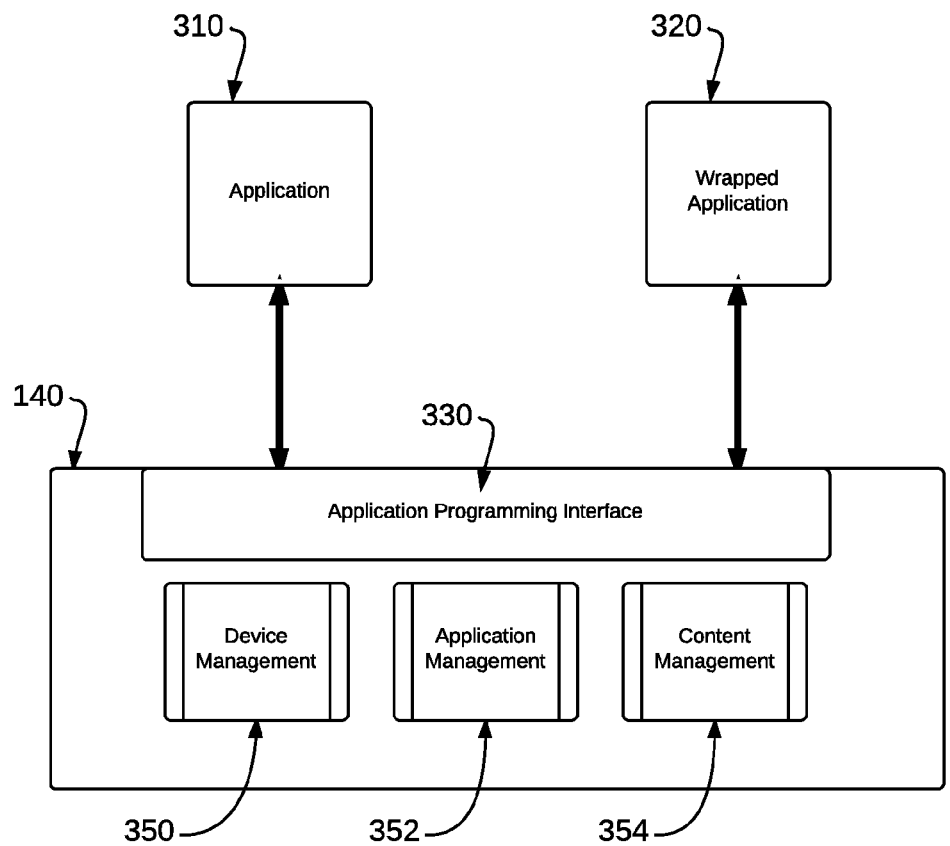
FIG. 3 is a block diagram of a platform library associated with the user device.

FIG. 3 is a block diagram illustrating greater detail regarding the platform library 140. An application 310 and/or a wrapped application 320 may communicate with platform library 140 via a plurality of function calls comprising an application programming interface (API) 330. In some embodiments, application 310 and wrapped application 320 may utilize the same calls. In some embodiments, application 310 and wrapped application 320 may utilize different versions of the function calls despite being associated with the same and/or similar functionality. The function calls may allow the applications to access various features and functionality provided by the platform library 140, such as a set of device management functions 350, a set of application management functions 352, and/or a set of content management functions 354.

Application 310 may comprise an application that has been modified at the source code level to incorporate calls associated with a software development kit (SDK). The SDK may provide a set of function calls that may be incorporated via a library during the application's compile step and may then call out to API 330.

Wrapped application 320 may comprise a modified binary executable file. The modifications may comprise the injection of precompiled functions to an existing application that may call out to API 330. In some embodiments, app-wrapping may be accomplished dynamically upon installation and/or execution of an application without requiring recompilation of the application's source code. App-wrapping may thus comprise a preferred and/or more convenient means of modifying an application for which the source code is unavailable.

In some embodiments, compliance rules such as those provided by compliance server 220 may control which functions of API 330 are enabled and/or used in application 310 and wrapped application 320. For example, users in a sales group may be permitted by compliance server 220 to download an enterprise's expense submitting application without modification, while users in an accounting group may receive a modified version of the same application. The modified version may rely on functionality provided by platform library 140 to enhance the application's security, such as by adding a call to an encryption function for communications from the application that are intended for transmission over network 240.

Various functions may be provided by platform library 240, including authentication, authorization, and determination functions. Device management functions 350 may comprise, for example, functions operative to determine whether user device 100 has been compromised and/or jailbroken, and/or to identify a location of the device via accessing a global positioning system associated with the device. Application management functions 352 may comprise, for example, functions operative to encrypt data and/or communications used by application 310 and wrapped application 320, to distribute configuration information, to provide authorization and/or credentials, and/or to provide logging and reporting functionality. Content management functions 354 may comprise, for example, functions to update shared content data used by application 310 and wrapped application 320 and/or to provide branding functionality to alter the appearance of application 310 and wrapped application 320.

Other management functionality may comprise enforcing compliance rules and/or restrictions distributed by compliance server 220, which may be accomplished at the device, application, and/or content level. Such compliance rules may comprise time, date and/or location based restrictions on accessing user device 100, application 310, wrapped application 320, local assets 156, and/or remote assets 212.

In some embodiments, performance of various actions by user device 100 may be contingent on approval, such as may be provided by agent 234 and/or a call to a compliance verification function via API 330. Such approval may require a determination as to whether necessary resources are available and/or authorized for use to accomplish the action. In cases where the necessary resources comprise metered resources, the compliance rules may enforce restrictions on the use of those metered resources as such resources may be associated with an additional cost to replenish once they are depleted.

FIG. 4 is a flow chart setting forth the general stages involved in a method 400 consistent with embodiments of this disclosure for providing functionality management via application modification. Method 400 may be implemented using elements of operating environment 200 as described above. Ways to implement the stages of method 400 will be described in greater detail below. Method 400 may begin at starting block 405 and proceed to stage 410 where user device 100 may receive a request to perform an action. For example, secure application 237 may attempt to retrieve assets 212 from asset server 210.

From stage 410, method 400 may advance to stage 415 where user device 100 may determine whether the requested action may consume a metered resource. For example, a request to retrieve content assets 212 from asset server 210 may be determined to consume metered data and/or metered battery power and/or a financial charge may be incurred to perform the requested action.

If the requested action is determined to require the use of metered stage 415, method 400 may advance to stage 420 where user device 100 may determine whether the requested action is compliant with at least one compliance and/or management policy. For example, compliance server 220 may distribute a management policy requiring user device 100 to maintain a sufficient level of metered data available to regularly communicate with compliance server 220, such as to transmit logs, messages, errors, etc. If the requested action would deplete the amount of metered data available below this level, the action may be determined to be out of compliance. For another example, a management policy may require applications to consume less than a given amount of battery power per day. If the requested action is associated with such a restricted application, and the amount of battery power required to perform the action would exceed the configurable threshold, the action may be determined to be out of compliance.

In some embodiments, user device 100 may identify a plurality of actions associated with completing the requested action and calculate the total resources consumed by performing the action. For example, a request to download assets 212 for storage on user device 100 may consume metered data resources for negotiating the network transfer, downloading the asset, confirming and/or acknowledging the completed transfer, and transmitting an event log to compliance server 220. Storing the downloaded copy of asset 212 may consume data storage resources, and each of these operations may consume battery power resources. One and/or a plurality of management policies may govern the use of each of these resources, and the request to perform the action may need to be determined to be compliant with one and/or more of the resource use polices to be determined to be in overall compliance.

If the request to perform the action is determined to be in compliance at stage 420, or if the action is determined not to consume any metered resources at stage 415, method 400 may advance to stage 425 where user device 100 may authorize the requested action to be performed. For example, agent application 234 may be configured to receive the requests to perform actions and/or intercept such requests from operating system 115, platform library 140, and/or other applications. Once the action is approved, agent 234 may authorize the action to be performed, such as by causing the operating system 115 to complete the requested action.

If the requested action is determined to be out of compliance at stage 420, method 400 may advance to stage 430 where user device 100 may identify a priority of the requested action. For example, a request to download legally mandated content assets by a particular time frame (e.g., flight manual updates), may be rated as a very high priority, while a request to update a game application may be rated as a low priority. These priority ratings may be established, for example, by administrators using rules distributed by compliance server 220. These rules may be configured to assign higher priorities to work and/or enterprise associated functions. These rules may also be user and/or user group dependent. For example, users in a support and/or sales group may have higher priorities assigned to email retrieval using metered data resources than users in an accounting group.

From stage 430, method 400 may advance to stage 435 where user device 100 may determine whether the identified priority is high enough to override the non-compliance determined at stage 420. For example, priority scores may be assigned to various actions and/or steps associated with performing the action, and the score may be compared to a configurable threshold. In some embodiments, such a threshold may be statically defined, such as where a particular metered resource may only be consumed if the priority is greater than a particular threshold value. In some embodiments, the threshold may comprise a dynamic value taking factors into account such as the time of the request, the location of user device 100, and an amount of the metered resource remaining.

If the requested action is determined to comprise a high enough priority, method 400 may return to stage 425 and authorize the request to perform the action, as described above. Otherwise, or after authorizing the request at stage 425, method 400 may end at stage 450.

Methods, systems, apparatuses, and/or computer-readable media for providing device management via application modification may be provided. In some embodiments, a request to perform an action may be received. Upon determining that the action is associated with a metered resource, a further determination may be made as to whether the request complies with at least one management policy. In response to determining that the request complies with the at least one management policy, the requested action may be authorized and/or caused to be performed. The metered resource may comprise, for example a data communication resource, a power resource, a financial resource, and/or a hardware resource. In some embodiments, modification of an application may comprise introducing new function calls to an application programming interface (API) operative to receive the request to perform the action, such as by modifying source code and recompiling the application to add a software development kit (SDK) library and/or modifying the binary executable of an application via app-wrapping. Such API calls may, for example, modify an application to redirect a plurality of requests to perform action to a second application.

In some embodiments, receiving the request to perform the action may comprise intercepting the request from an application by an agent application. In some embodiments, determining whether the action is associated with a metered resource may comprise determining whether authorizing the action to be performed would consume at least a portion of the metered resource via identifying a plurality of functions associated with the action to be performed and computing an amount of the metered resource consumed by each of the plurality of functions. Determining whether the request complies with the at least one management policy may comprise determining whether the computed amount of the metered resource consumed by each of the plurality of functions exceeds a quota amount of the metered resource.

In some embodiments, a priority may be associated with the request to perform the action. If the priority exceeds a threshold value, but the request is determined to be non-compliant with a management and/or cost control policy, a notification and/or a request for a user to override the policy may be displayed.

In some embodiments, upon receiving a request to perform an action associated with an application, a determination as to whether performing the action will utilize a metered resource may be made. If so, a further determination may be made as to whether the request complies with at least one cost compliance policy and, in response to determining that the request complies with the at least one cost compliance policy, the action may be caused and/or authorize to be performed. Such cost compliance policies may, for example, be associated with a monthly subscription and/or a pre-paid quantity of the metered resource. The compliance policies may comprise a plurality of factors and/or conditions, such as location of a device, time of the request, type of request, and/or category of request (e.g., work or personal).

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of this disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. The Figures above and their associated descriptions provide a discussion of a variety of operating environments in which embodiments of this disclosure may be practiced. However, the devices and systems illustrated and discussed with respect to the Figures are for purposes of example and illustration and are not limiting of a vast number of computing device configurations that may be utilized for practicing embodiments of this disclosure as described herein.

The term computer readable media as used herein may include computer storage media. Computer storage media may include volatile and non-volatile, removable and non-removable media implemented in any method or technology for storage of information, such as computer readable instructions, data structures, program modules, or other data. System memory, removable storage, and non-removable storage are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store.

The term computer readable media as used herein may also include communication media. Communication media may be embodied by computer readable instructions, data structures, program modules, non-transitory media, and/or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

A number of applications and data files may be used to perform processes and/or methods as described above. The aforementioned processes are examples, and a processing unit may perform other processes. Other programming modules that may be used in accordance with embodiments of this disclosure may include electronic mail, calendar, and contacts applications, data processing applications, word processing applications, spreadsheet applications, database applications, slide presentation applications, drawing or computer-aided application programs, etc.

Generally, consistent with embodiments of this disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of this disclosure may also be practiced in distributed computing environments where tasks are performed by remote processing devices that are linked through a communications network. In a distributed computing environment, program modules may be located in both local and remote memory storage devices.

Furthermore, embodiments of this disclosure may be practiced in an electrical circuit comprising discrete electronic elements, packaged or integrated electronic chips containing logic gates, a circuit utilizing a microprocessor, or on a single chip containing electronic elements or microprocessors. Embodiments of this disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of this disclosure may, for example, be implemented as a computer process and/or method, a computing system, an apparatus, device, or appliance, and/or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of this disclosure may be practiced via a system-on-a-chip (SOC) where each and/or many of the elements described above may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, with respect to training and/or interacting with any element may operate via application-specific logic integrated with other components of the computing device/system on the single integrated circuit (chip).

Embodiments of this disclosure are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/ or inserting or deleting stages, without departing from the disclosure.

All rights including copyrights in the code included herein are vested in and the property of the Assignee. The Assignee retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
receiving, in at least one computing device, a request to perform an action associated with an application, wherein the application is modified to redirect a plurality of requests to perform the action to a second application;

identifying, by the at least one computing device, a plurality of functions associated with the action to be performed;

computing, by the at least one computing device, an amount of the metered resource consumed by each of the plurality of functions;

determining, by the at least one computing device, whether performing the action will utilize a metered resource;

in response to determining that performing the action will utilize the metered resource, determining, by the at least one computing device, whether the request complies with at least one cost compliance policy by determining whether the computed amount of the metered resource consumed by each of the plurality of functions exceeds a quota amount of the metered resource; and in response to determining that the request complies with the at least one cost compliance policy, authorizing, by the at least one computing device, the action to be performed.

2. The method of claim 1, wherein the cost compliance policy is associated with a monthly data subscription.

3. The method of claim 1, wherein the cost compliance policy is associated with a pre-paid quantity of the metered resource.

4. The method of claim 1, wherein the cost compliance policy is location-dependent.

5. The method of claim 1, wherein the cost compliance policy is time-dependent.

6. The method of claim 1, further comprising providing, from the at least one computing device, an application programming interface (API) call operative to receive the request.

7. The method of claim 1, wherein receiving the request to perform the action comprises intercepting the request from an application by an agent application.

8. The method of claim 1, wherein the at least one cost compliance policy is associated with a plurality of metered resources.

9. A system comprising:
a memory storage; and
a processor coupled to the memory storage, wherein the processor is configured to:
receive a request to perform an action associated with an application, wherein the application is modified to redirect a plurality of requests to perform the action to a second application,
determine whether performing the action will utilize a metered resource;
in response to determining that the action will utilize the metered resource, identify a plurality of functions associated with the action to be performed;
compute an amount of the metered resource consumed by each of the plurality of functions;
determine whether the request complies with at least one cost compliance policy by determining whether the computed amount of the metered resource consumed by each of the plurality of functions exceeds a quota amount of the metered resource; and
in response to determining that the request complies with the at least one cost compliance policy, authorize the action to be performed.

10. The system of claim 9, wherein the second application comprises a communicatively coupled remote application.

11. The system of claim 9, wherein the request to perform the action comprises a priority.

12. The system of claim 11, wherein the processor, in response to determining that the request does not comply with the at least one cost compliance policy, is configured to:
determine whether the priority associated with the request to perform the action exceeds a threshold, and
in response to determining that the priority associated with the request to perform the action exceeds a threshold, authorize the action to be performed.

13. A non-transitory computer-readable medium which stores a set of instructions that when executed performs a method executed by the set of instructions comprising:
receiving a request to perform an action associated with an application, wherein the application comprise a modified version of the application, the application being modified based on modification of source code associated with the application;
determining whether performing the action will utilize a metered resource;
in response to determining that the action will utilize the metered resource, identifying a plurality of functions associated with the action to be performed;
computing an amount of the metered resource consumed by each of the plurality of functions;
determining whether the request complies with at least one cost compliance policy by determining whether the computed amount of the metered resource consumed by each of the plurality of functions exceeds a quota amount of the metered resource; and
in response to determining that the request complies with the at least one cost compliance policy, authorizing the action to be performed.

14. The non-transitory computer-readable medium of claim 13, wherein the modification to the application comprises inserting at least one application programming interface (API) call to the application, and wherein the API call is associated with determining whether the request complies with at least one cost compliance policy.

15. The non-transitory computer-readable medium of claim 13, wherein the modification to the application is associated with a binary executable of the application.

* * * * *